(12) United States Patent
Shen et al.

(10) Patent No.: US 8,211,340 B2
(45) Date of Patent: Jul. 3, 2012

(54) PROCESS FOR THE PRODUCTION OF SQUARED-ANALOGOUS CROSS-SECTION POLYAMIDE YARNS AND USES THEREOF

(75) Inventors: Swu-Chen Shen, Pinchen (TW); Yi-Jen Tu, Pinchen (TW)

(73) Assignee: Shinkong Synthetic Fibers Corporation, Taipei (TW)

( * ) Notice: Subject to any disclaimer, the term of this patent is extended or adjusted under 35 U.S.C. 154(b) by 1055 days.

(21) Appl. No.: 12/213,025

(22) Filed: Jun. 13, 2008

(65) Prior Publication Data

US 2009/0136750 A1    May 28, 2009

(30) Foreign Application Priority Data

Nov. 23, 2007  (TW) .............................. 96144362 A

(51) Int. Cl.
| | |
|---|---|
| *D01D 5/08* | (2006.01) |
| *D01D 5/16* | (2006.01) |
| *D01D 5/253* | (2006.01) |
| *D01F 6/60* | (2006.01) |
| *D02G 3/02* | (2006.01) |
| *D02J 1/22* | (2006.01) |

(52) U.S. Cl. .................... 264/103; 264/130; 264/177.13; 264/210.5; 264/210.7; 264/210.8; 264/211.14; 264/342 RE

(58) Field of Classification Search .................. 264/103, 264/177.13, 210.5, 210.7, 210.8, 342 RE, 264/130, 211.14
See application file for complete search history.

(56) References Cited

U.S. PATENT DOCUMENTS

| | | | | |
|---|---|---|---|---|
| 4,702,875 | A | * | 10/1987 | Jennings .................. 264/177.13 |
| 5,108,838 | A | * | 4/1992 | Tung .................... 264/177.13 X |
| 5,922,366 | A | * | 7/1999 | Short .................... 264/177.13 X |
| 7,585,440 | B2 | * | 9/2009 | Marlow ........................ 264/103 |

FOREIGN PATENT DOCUMENTS

EP          1878817 A1 *    1/2008

\* cited by examiner

*Primary Examiner* — Leo B Tentoni
(74) *Attorney, Agent, or Firm* — Rosenberg, Klein & Lee

(57) ABSTRACT

The present invention relates to a process for the production of a yarn consisting of a squared-analogous cross-section polyamide filament for uncoated airbag fabrics, characterized in that the process comprises the steps of: heating and melting a raw material of polyamide, extruding the molten polyamide through a squared-analogous spinning nozzle to form a spun filament, cooling and solidifying the spun filament, followed by drawing the filament, to obtain a squared-analogous cross-section drawn yarn; to uncoated fabrics for the manufacture of airbags prepared by the said process, characterized in that the fabrics are prepared from a yarn consisting of a squared-analogous cross-section polyamide filament and exhibit low air permeability, enhanced flame resistance and aging performance against the environment; and to a use of the uncoated fabrics for the manufacture of airbags with a low air permeability prepared therefrom.

6 Claims, 4 Drawing Sheets a squared shape
(A/B=1.414)

a circular shape
(A/B=1)

where the radius of circle is
1 unit (i.e. B=1)

Cross-section of fabrics with squared-analogous yarns

Cross-section of fabrics with circular yarns

PROCESS FOR THE PRODUCTION OF SQUARED-ANALOGOUS CROSS-SECTION POLYAMIDE YARNS AND USES THEREOF

BACKGROUND OF THE INVENTION

1. Field of the Invention

The present invention relates to a process for the production of a yarn consisting of a squared-analogous cross-section polyamide filament for uncoated airbag fabrics, to uncoated fabrics for airbags prepared by the said process, and to uses of uncoated fabrics with low air permeability prepared by the said process for the manufacture of airbags.

2. Description of Related Arts

Recently, the needs of airbags secured in vehicles is greatly increased as the recognition of the users on safety is gradually increasing, thereby protecting the drivers and passengers and reducing the occurrence of their injury.

Fabrics used for the manufacture of airbags are generally required to have low air permeability in order to achieve inflation upon being impacted and to have high strength in order to avoid rendering the airbags cracked. Further, the property of flexibility is also required in order to avoid scraping the face of passenger upon inflating.

Conventionally, in the manufacture of fabrics for airbags, it is usually necessary to apply a rubber onto the surface of fabrics in order to prepare fabrics with low air permeability. However, such a processing method presents many problems. Specifically, after the processing treatment of the fabrics, it results in many disadvantages include, for example, increasing the weight of base cloth of fabrics, lowering the flexibility, increasing the manufacture cost and difficulty of recycling, etc. Hence, there should be an active development on uncoated fabrics with low air permeability used in the manufacture of airbags.

It was known that the prior arts of, such as, Japanese Published Application Number Hei 6-41844, U.S. Pat. No. 5,073,418, Japanese Published Application Number Hei 7-252740, etc. have disclosed uncoated base fabrics.

Japanese Published Application Number Hei 6-41844 discloses a base cloth for airbags of vehicles, which is produced by the steps of: treating fabrics using chemical contraction, swelling the treated yarns, and thus preparing a base cloth with low air permeability. However, this process for the production of the base cloth results in increasing the production cost due to the proceeding of chemical treatment as well as lowering the strength of a gray yarn (i.e. a base cloth) due to the presence of chemical reagents.

U.S. Pat. No. 5,073,418 discloses fabrics with low air permeability, airbags prepared the same and the preparation thereof, which are characterized in that a cloth is woven by using (for example) less than or equal to 600 denier of a gray yarn and then processed using calendar to lower the air permeability of fabrics. However, the process disclosed in this US patent presents problems including lowering the tear strength of cloth, etc.

Further, Japanese Published Application Number Hei 7-252740 discloses a base cloth for airbags, which is prepared by using a yarn with flat-like cross-section, where the yarn as a raw material exhibits a degree of flatness of more than or equal to 1.5 in order to obtain a base cloth with low air permeability, good foldability and retractable properties and can be used as a base cloth for the manufacture of uncoated airbags. However, in this process, as the thus-prepared base cloth exhibits air permeability of more than or equal to 0.3 cc/cm$^2$/sec at a pressure of 124 Pa, it cannot satisfy with the recent requirement of airbags that need lower air permeability.

In view of the known technologies as mentioned above, in order to solve the disadvantages and problems present in the said, the inventors of the present invention thus develop a process for the production of yarns for uncoated airbag fabrics. The thus-prepared yarns by the process of the present invention can be used in fabrics for the manufacture of airbags without additional rubber-coating process thereonto and can satisfy with the requirement of low air permeability for fabrics of airbags.

SUMMARY OF THE INVENTION

An objective of the present invention is to provide a process for the production of a yarn consisting of a squared-analogous cross-section polyamide filament for uncoated airbag fabrics, characterized in that the process includes the steps of: extruding a polyamide as a raw material through a squared-analogous spinning nozzle after melting the raw material by heating; and subsequently solidifying the spun polyamide filament by cooling, followed by drawing, to obtain a drawn yarn consisting of a squared-analogous cross-section polyamide filament.

A further objective of the present invention is to provide fabrics for uncoated airbags which are prepared by the process of the present invention as stated above, characterized in that the fabrics are constituted by squared-analogous cross-section yarns. The squared-analogous cross-section yarns exhibit the character of difficult rolling and the fabrics woven therefrom exhibit high packing and shielding properties in the same longitude and latitude directions, thereby providing fabrics with low air permeability. Further, the result of low air permeability can enhance the performances of fabrics, such as flame resistance, weather resistance to environment, etc., and can increase the competitive ability of products.

Via applying the property of low air permeability as stated above, the thus-prepared squared-analogous cross-section yarns are particularly suitable for any need that require fabrics for the manufacture of airbags to have low air permeability. Hence, the still further objective of the present invention is to provide a use of fabrics with low air permeability and prepared by the process for the manufacture of uncoated airbags.

THE DESCRIPTION OF THE SYMBOLS OF ESSENTIAL ELEMENTS

| | |
|---|---|
| 1 | Spinning assembly |
| 2 | Squared-analogous spinning nozzle |
| 3 | Delayed cooling zone |
| 4 | Cooling zone |
| 5 | Melt-spun yarn |
| 6 | Oiling means |
| 7, 8, 9, 10, 11 | Drawing godet rollers |
| 12 | A squared-analogous polyamide drawn yarn |

DETAILED DESCRIPTION OF THE INVENTION

Figure 1:
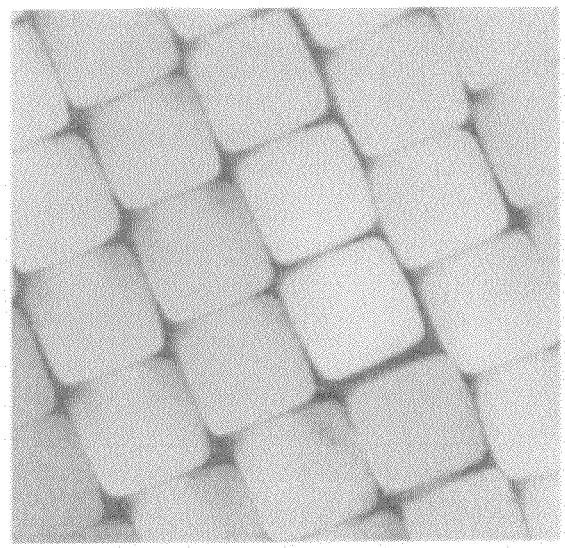
FIG. 1 shows the cross-section of a squared-analogous yarn.

In the present invention, the term "a squared-analogous cross-section filament(s)" or "a squared-analogous cross-section yarn(s)" refers to the filament(s) or yarn(s) having a right squared cross-section or the analogue, for example, as shown in FIG. 1.

Figure 2:
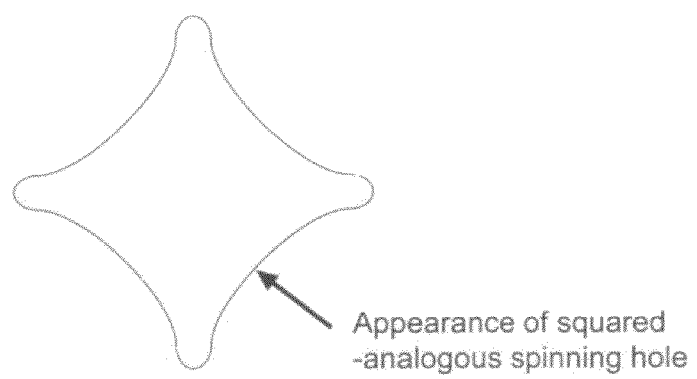
FIG. 2 shows the appearance of a hole of a squared-analogous spinning nozzle.

In the present invention, the term "the squared spinning nozzle" or "the squared-analogous spinning nozzle" refers to the spinning nozzle having right squared holes or holes with inwardly caving arc at four sides, for example, as shown in FIG. 2.

According to the present invention, the process for the production of a yarn consisting of a squared-analogous cross-section polyamide filament for uncoated airbag fabrics is characterized by comprising the steps of: after melting a raw material of polyamide by heating, extruding the molten polyamide material via a squared-analogous spinning nozzle; solidifying the molten polyamide filament by cooling, followed by drawing the same, to obtain a squared-analogous cross-section drawn yarn.

Figure 3:
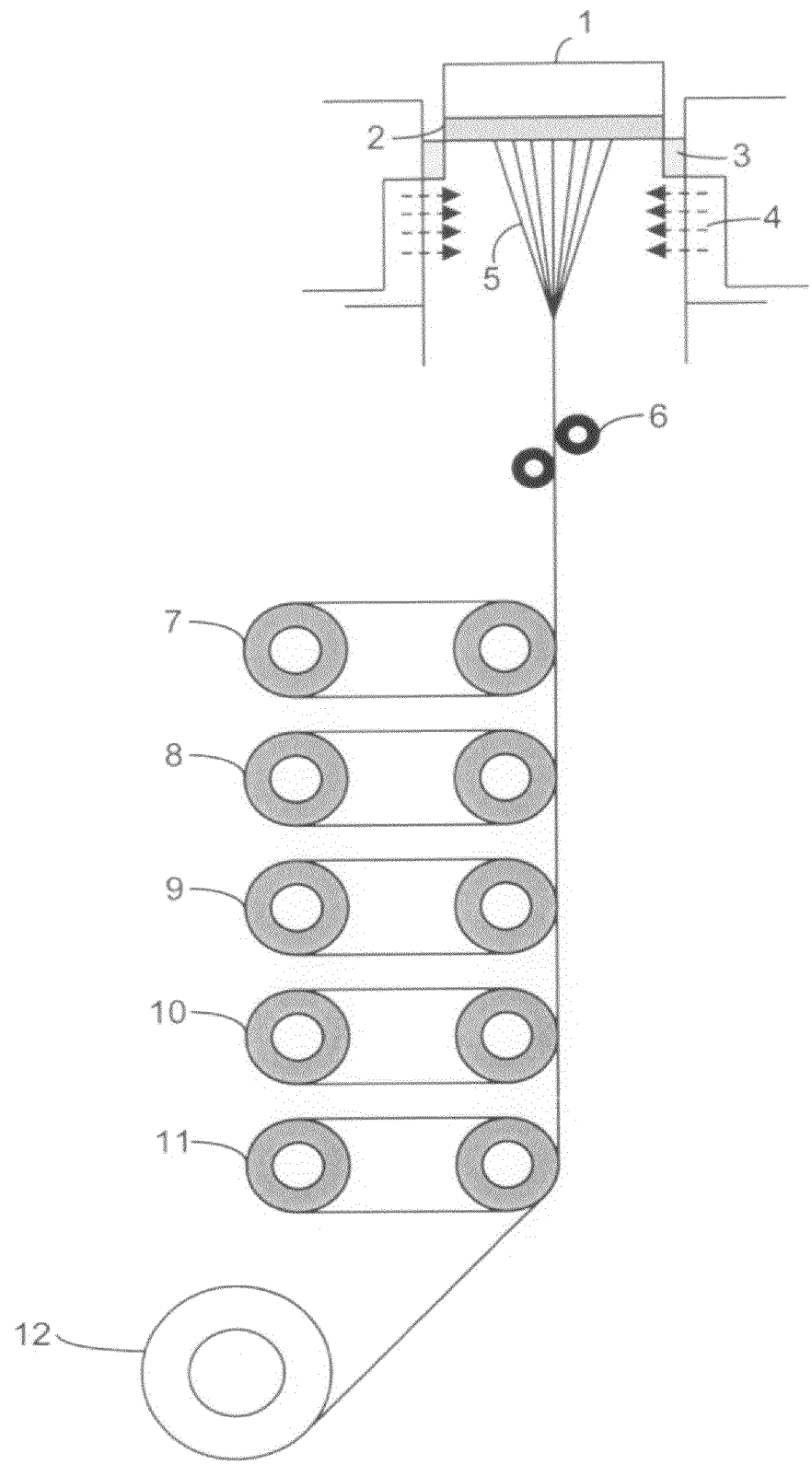
FIG. 3 shows the flow chart of spinning processes for producing a yarn consisting of a squared-analogous cross-section polyamide filament according to the present invention.

According to an embodiment of the present invention, as shown on FIG. 3, the process of the present invention for the production of a yarn with a squared-analogous cross-section polyamide filament for uncoated airbag fabrics, comprising the steps of:
(A) introducing a polyamide as a raw material through spinning assembly 1 and a squared-analogous spinning nozzle 2, to carry out melt-spinning a filament,
(B) subsequently, solidifying the filament 5 by cooling through a cooling zone 4 after the introduction of a melt-spun filament 5 through the delayed cooling zone 3,
(C) introducing the cooled, solidified, spun filament 5 through oiling rollers 6 to oil the filament, and
(D) introducing the oiled spun filament through continuous drawing godet rollers 7, 8, 9, 10 and 11, to produce a drawn yarn 12 having a squared-analogous cross-section polyamide filament.

According to the process of the present invention, the polyamide as a raw material is selected from the group consisting of an aliphatic polyamide and the copolymer thereof, preferably a $C_{4-12}$ aliphatic polyamide and the copolymer thereof, or combination thereof. Preferably, an aliphatic polyamide is selected from the group consisting of polyamide 66, polyamide 46, polyamide 6 and polyamide 12, alone or in the form of combination. More preferably, an aliphatic polyamide is selected from the group consisting of polyamide 66 or polyamide 46, alone or in the form of combination. According to an embodiment of the process of the present invention, in the preparation of a yarn consisting of a squared-analogous cross-section polyamide filament according to the present invention, the molten polyamide as a raw material exhibits a relative viscosity (RV) in a range of more than or equal to 2.7, preferably in a range of 3.3 to 3.6.

According to the process of the present invention, in step (A), the raw material of polyamide is introduced into a spinning assembly 1 and then melt-spun via a squared-analogous cross-section spinning nozzle 2 at a melt-spun temperature of 270 to 320° C., to form a filament.

In step (B) of the process according to the present invention, the spun filament 5 is introduced through a delayed cooling zone 3 and solidified by air cooling in cooling zone 4.

In the process of the present invention for the production of a yarn consisting of a squared-analogous cross-section polyamide filament, a undrawn filament is spun at a velocity of 400 to 800 m/min by using continuous Spin-Draw means, and then drawn through drawing godet rollers 7, 8, 9, 10, 11, to carry out drawing, thermal setting and stress-relaxing procedures. The total drawing ratio is in a range of more than or equal to 4.0 times, preferably 4.5 to 6.5. The thermal setting temperature is in a range of 180 to 250° C., preferably 200 to 220° C. The relaxing ratio is in a range of 2% to 12%, preferably 5% to 10%.

The drawn yarn with a squared-analogous cross-section polyamide filament according to the present invention can also be prepared by a discontinue process. Namely, a partial oriented filament is firstly prepared and then the filament is carried out multiple-stage processes including the steps of drawing, thermal setting and relaxing procedures, to form a drawn yarn consisting of a squared-analogous cross-section polyamide filament.

The squared-analogous cross-section yarn prepared by the process of the present invention exhibits a squared isotropy holding ratio (A/B) in a range of 1.100 to 1.414, preferably 1.160 to 1.414. Further, the yarn exhibits a total fineness in a range of 150 De to 1000 De and a strength in a range of 7.5 to 9.5 G/d. The elongation of the yarn at breakage is in a range of 18 to 30%. The dry heat shrinkage of the yarn is in a range of 4.0 to 10.0%. Fabrics woven from the said yarn exhibit air permeability in a range of less than 0.2 $cc/cm^2/sec$ at a pressure of 124 Pa.

Figure 4A:
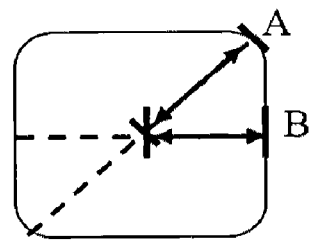
FIGS. 4a and 4b show the squared isotropy holding ratio (A/B) of a squared-analogous yarn, wherein A/B shown in FIG. 4b is 1.414.
Figure 4B:
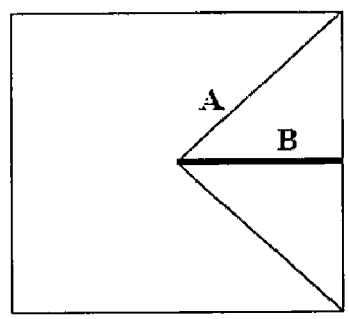
Figure 4C:
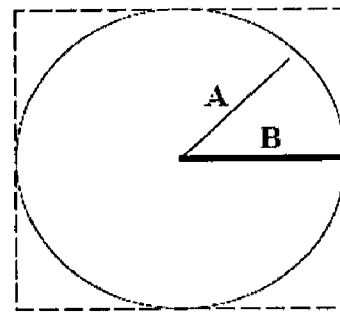
FIG. 4c shows the squared isotropy holding ratio (A/B) of a conventional circular cross-section yarn, assuming the radius of the circle is one unit (i.e. B=1), wherein A/B shown in FIG. 4c is 1.

In the present invention, the squared anisotropic holding ratio of a squared yarn for airbag fabrics is defined as A/B, as shown on FIGS. 4a and 4b, where A represents one half of the diagonal length of a squared cross-section yarn, and B represents one half of the width of a squared cross-section yarn. In contrast, as shown on FIG. 4c, a circular cross-section yarn conventionally prepared via a circular spinning nozzle exhibits a holding ratio (A/B) in a value of 1, where the radius of circle is 1 unit and thus A/B is equal to 1 (i.e. A=B=1).

Figure 5A:
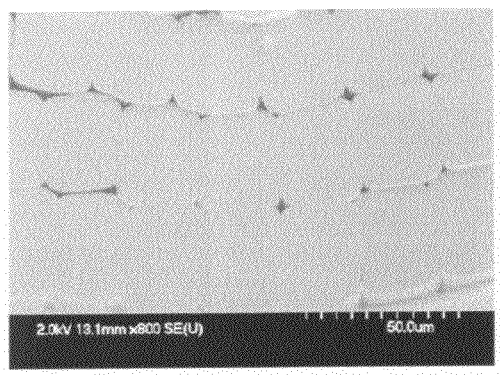
FIG. 5a shows the cross-section of fabrics with squared-analogous yarns.
Figure 5B:
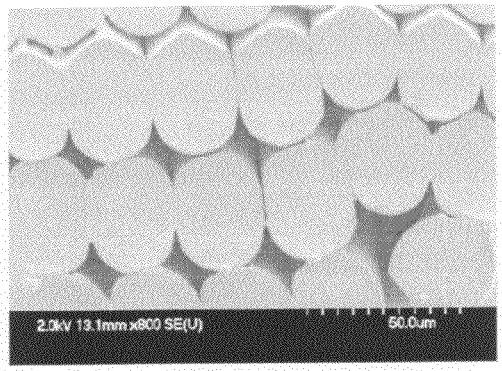
FIG. 5b shows the cross-section of fabrics with circular yarns.

Fabrics woven from a squared-analogous cross-section yarn according to the present invention are shown on FIG. 5a. As compared with the fabrics shown on FIG. 5b formed from a circular cross-section yarn via a conventional circular spinning nozzle, the squared-analogous cross-section yarn woven according to the present invention exhibits a more dense structure.

EXAMPLES

The present invention will be specifically illustrated by the following examples. However, these examples are not intended to limit the scope of the present invention. Although the numbers and parameters in broader extent are close values, they are accurately recorded in the specific examples as possible.

In the present invention, the physical properties of yarns and fabrics prepared by the examples and comparative examples are determined and evaluated in accordance with the following means.

(1) Relative Viscosity (RV):

A sample to be determined is prepared from polyamide pellets, wherein the water content contained in the sample should be controlled to in a range of less than 2800 ppm. If the water content is more than the above content, the polyamide pellets to be determined need be pre-dried at a temperature of 90° C. under a vacuum condition to achieve the desired water content.

A sample prepared from polyamide pellets with the standard water content is dissolved in 96% sulfuric acid. After the sample is completely dissolved, the flow time is measured by using an Ubbelohode viscometer. The relative viscosity (RV), as compared with a solvent, is calculated according to the following equation:

Relative Viscosity (RV)=Dropping time of sample (second)/Dropping time of solvent (second)

(2) Strength and Elongation of Yarns:

A sample is kept under standard conditions (24±1° C., relative humidity 55±2%) for 24 hours. In accordance with the standard test method of ASTM D 885, strength and elongation (%) of a sample at a length of 250 mm are measured at a tensile speed of 300 mm/min and 20 turns/m by using STATIMAT 4 Instron (Textechno Inc., Germany).

(3) Dry Heat Shrinkage (%) of Yarns:

Dry heat shrinkage is measured by using FST-3000R (Force Shrinkage Tester With Temperature Ramp, Lawson-Hemphill Inc, USA) in accordance with the standard test method of ASTM D 885.

A sample is kept under standard conditions (24±1° C., relative humidity 55±2%) for 24 hours. In accordance with the standard test method of ASTM D 4974, the dry heat shrinkage of sample is measured at a pre-tension weight (g) of 0.05 g/denier and at a temperature of 177° C. for a period time of 2 minutes. The shrinkage is calculated in accordance with the following equation:

Shrinkage (%)=[($L_0$-L)/$L_0$]×100 where $L_0$ is a yarn length before measuring, and L is a yarn length after measuring.

(4) Squared Anisotropic Holding Ratio of Squared Yarns:

The cross-sections of ten monofilaments are taken a photography by using an optical microscopy at a magnification of 400 times, thereby measuring the ½ diagonal length of a monofilament with squared cross-section (i.e. A) and ½ width of a monofilament with squared cross-section (i.e. B). The squared anisotropic holding ratio is measured and calculated by an average value according to the following equation:

Squared Anisotropic Holding Ratio=(A/B)

(5) Thickness of Fabrics:

The thickness of fabrics is measured according to the standard method of ASTM D 1777.

(6) Weight of Fabrics:

The weight of fabrics is measured according to the standard method of ASTM D 3776.

(7) Air Permeability of Fabrics:

The air permeability of fabrics is measured at a pressure of 124 Pa by using a air permeability determination device according to the standard test method of ASTM 737.

(8) Test for Flame Resistance of Fabrics:

The flame resistance of fabrics is tested according to the standard method of FMVSS 302.

(9) Aging Test for Fabrics by the Acceleration of Ambient Environment:

Aging test is carried out at an elevated temperature of +107° C. in a time period of 408 hours.

Aging test is sequentially carried out in one cycle at warm and humid conditions as follows:

[at −40° C., over 29 hours→at +22° C., 95% RH, over 19 hours→at +107° C., over 29 hours→at 22° C., 95% RH, over 19 hours].

The test is performed a total of three cycles.

(10) Test for Strength of Fabrics:

The strength of fabrics is tested according to the standard test method of ASTM D 5034.

Example 1

In accordance with the process shown on FIG. 3, polyamide 66 pellets with a relative viscosity (RV) of 3.3 are introduced into a spinning assembly 1 at a temperature of 292° C. to carry out melt-spinning. The molten polyamide 66 is extruded via a squared-analogous spinning nozzle 2 shown on FIG. 2. Then the filaments pass through the delayed cooling zone 3 which the length (L) is 5 cm, the filaments are solidified by cooling at a rate of 0.5 m/s under the cold air supplied by a cooling zone 4. The solidified spun filaments 5 passing through the cooling zone 4 are oiled via an oiling device 6, and then are introduced through five assemblies of continuous drawing godet rollers 7, 8, 9, 10 and 11. After the filaments are drawn at a total drawing ratio of 4.9 times and practiced a relaxing treatment at a range of 7%, the filaments are carried out interlacing via an interlacing device (not shown). The spun filaments are wound at a rate of 2965 m/min by using a winding machine. Finally, drawn yarns 12 consisting of squared-analogous cross-section polyamide filaments are obtained. The thus-prepared squared-analogous drawn yarns are useful in the manufacture of fabrics for uncoated airbags with low air permeability.

The physical properties of the thus-prepared drawn yarns are measured and evaluated. The test results are shown on Table 1.

Example 2

The filaments are prepared in the same procedures and conditions as those in Example 1, except that the length (L) of delayed cooling zone in Example 2 is 10 cm. Finally, drawn yarns consisting of squared-analogous cross-section polyamide filaments are formed.

The physical properties of the thus-prepared drawn yarns are measured and evaluated. The test results are shown on Table 1.

Example 3

The filaments are prepared in the same procedures and conditions as those in Example 1, except that the length (L) of delayed cooling zone in Example 3 is 15 cm. Finally, drawn yarns consisting of squared-analogous cross-section polyamide filaments are formed.

The physical properties of the thus-prepared drawn yarns are measured and evaluated. The test results are shown on Table 1.

Comparative Example 1

The filaments are prepared in the same procedures and conditions as those in Example 3, except that squared-analogous nozzle is replaced with a circular shape nozzle in Comparative Example 1. Finally, drawn yarns consisting of circular cross-section polyamide filaments are formed.

The physical properties of the thus-prepared drawn yarns are measured and evaluated. The test results are shown on Table 1.

TABLE 1

|  |  | Example 1 | Example 2 | Example 3 | Comparative Example 1 |
|---|---|---|---|---|---|
| Length (L) of delayed cooling zone (cm) | | 5 | 10 | 15 | 15 |
| Heating temperature in delayed cooling zone (° C.) | | 270 | 270 | 270 | 270 |
| Physical properties of yarns | Total denier (De) | 420 | 420 | 420 | 420 |
| | Number of monofilament | 68 | 68 | 68 | 68 |
| | Denier of monofilament (De) | 6.18 | 6.18 | 6.18 | 6.18 |
| | Squared anisotropic holding ratio (A/B) | 1.30 | 1.23 | 1.16 | 1.00 |
| | Strength (G/d) | 8.50 | 8.62 | 8.7 | 8.7 |
| | Elongation (%) | 19.1 | 21.2 | 21.5 | 21.7 |
| | Dry heat shrinkage (%) | 6.5 | 6.7 | 6.7 | 6.7 |
| | Interlacing number (no./m) | 18 | 19 | 18 | 18 |

Example 4

The squared yarns prepared according to Example 1 are carried out plain-woven by using a water-jet loom machine, followed by the shrinkage processing treatment with boiling water, and then drying at a temperature of 110° C., to obtain fabrics with a density in longitudinal direction of 55 strands/inch and a density in latitudinal direction of 55 strands/inch.

The air permeability of the obtained fabrics is measured and the result is shown on Table 2.

Example 5

The squared yarns prepared according to Example 2 are carried out plain-woven by using a water-jet loom machine, followed by the shrinkage processing treatment with boiling water, and then drying at a temperature of 110° C., to obtain fabrics with a density in longitudinal direction of 55 strands/inch and a density in latitudinal direction of 55 strands/inch.

The air permeability of the obtained fabrics is measured and the result is shown on Table 2.

Example 6

The squared yarns prepared according to Example 3 are carried out plain-woven by using a water-jet loom machine, followed by the shrinkage processing treatment with boiling water and drying at a temperature of 110° C., to obtain fabrics with a density in longitudinal direction of 55 strands/inch and a density in latitudinal direction of 55 strands/inch.

The air permeability of the obtained fabrics is measured and the result is shown on Table 2.

Comparative Example 2

The circular yarns prepared according to Comparative Example 1 are carried out plain-woven by using a water-jet loom machine, followed by the shrinkage processing treatment with boiling water and drying at a temperature of 110° C., to obtain fabrics with a density in longitudinal direction of 55 strands/inch and a density in latitudinal direction of 55 strands/inch.

The air permeability of the obtained fabrics is measured and the result is shown on Table 2.

TABLE 2

|  | Density of Fabrics (strands/inch) | Thickness (mm) | Weight (g/cm$^2$) | Air Permeability (cc/cm$^2$/sec) |
|---|---|---|---|---|
| Example 4 | 55 × 55 | 0.29 | 221 | 0.131 |
| Example 5 | 55 × 55 | 0.30 | 222 | 0.167 |
| Example 6 | 55 × 55 | 0.30 | 222 | 0.174 |
| Comparative Example 2 | 55 × 55 | 0.30 | 228 | 0.381 |

Example 7

The flame resistance of fabrics formed from squared yarns prepared according to Example 6 is measured and the result is shown on Table 3.

Comparative Example 3

The flame resistance of fabrics formed from circular yarns prepared according to Comparative Example 2 is measured and the result is shown on Table 3.

TABLE 3

|  | Burning Length (mm) | Burning Time (sec) | Burning Rate (mm/min) |
|---|---|---|---|
| Example 7 | 8.5 | 10 | 51 |
| Comparative Example 3 | 254 | 173 | 88 |

Example 8

The accelerated aging test of fabrics formed from squared yarns prepared according to Example 6 is carried out under the ambient environment and then determined. The result is shown on Table 4.

Comparative Example 4

The accelerated aging test of fabrics formed from circular yarns prepared according to Comparative Example 2 is carried out under the ambient environment and then determined. The result is shown on Table 4.

TABLE 4

| Items of accelerated aging test for fabrics by the ambient environment | Examples | Strength (N) of fabrics before treatment | Strength (N) of fabrics after treatment | Strength retention ratio (%) |
|---|---|---|---|---|
| Aging Test at elevated | Example 8 | 2530 | 2510 | 99.2 |
| | Comparative | 2537 | 2463 | 97.1 |

TABLE 4-continued

| Items of accelerated aging test for fabrics by the ambient environment | Examples | Strength (N) of fabrics before treatment | Strength (N) of fabrics after treatment | Strength retention ratio (%) |
|---|---|---|---|---|
| temperature Aging test at warm and humid conditions | Example 4 Example 8 Comparative Example 4 | 2530 2537 | 2457 2363 | 97.1 93.1 |

According to the present invention, the yarn consisting of a squared-analogous cross-section polyamide filament prepared by the process of the present invention exhibits different structures and physical properties from a yarn consisting of a circular cross-section polyamide filament prepared by the known processes. As known from the above results, a yarn consisting of a squared-analogous cross-section polyamide filament prepared by the process of the present invention has low air permeability, excellent flame resistance and strength retention ratio. Further, as compared with the known yarn consisting of a circular cross-section polyamide filament, the yarn consisting of a squared-analogous cross-section polyamide filament by the process of the present invention exhibits a more dense structure, whereby the yarn is more useful in the manufacture of uncoated fabrics for airbag with low air permeability.

While the embodiments of the present invention described herein are presently preferred, various modifications and improvements can be made without departing from the spirit and scope of the present invention. The scope of the present invention is indicated by the appended claims, and all changes that fall within the meaning and range of equivalents are intended to be embraced therein.

What is claimed is:

1. A process for the production of a yarn having a squared-analogous cross-section polyamide filament for uncoated airbag fabrics, the process comprising the steps of:
   melting a raw material of polyamide;
   extruding the molten polyamide through a squared-analogous spinning nozzle;
   solidifying the molten polyamide by cooling; and
   drawing the polyamide filament to obtain a drawn yarn having a squared-analogous cross-sectional contour defining a diagonal length dimension and a width dimension, wherein the squared-analogous yarn exhibits a squared anisotropic holding ratio (A/B) in a range of from 1.100 to 1.414, the A/B ratio representing a proportional relationship between the diagonal length and width dimensions.

2. A process according to claim 1, wherein the squared-analogous yarn exhibits a total fineness of 150 De to 1000 De, a strength of 7.5 to 9.5 G/d, an elongation at breakage of 18 to 30% and a dry heat shrinkage of 4.0 to 10.0%.

3. A process according to claim 1, wherein the raw material of polyamide is selected from the group consisting of polyamide 66 and polyamide 46.

4. A process according to claim 1, wherein the drawn yarn having a squared-analogous cross-section polyamide filament is prepared in continuous manner by spun drawing, thermal setting and relaxing processes.

5. A process according to claim 1, wherein a partially oriented squared-analogous cross-section polyamide filament is firstly prepared, and then drawn by multiple-stage drawing, thermal setting and relaxing processes to carried out in discontinuous manner to obtain the drawn yarn.

6. A process for the production of a yarn having a squared-analogous cross-section polyamide filament for uncoated airbag fabrics, the process comprising the steps of:
   melting a raw material of polyamide;
   extruding the molten polyamide through a squared-analogous spinning nozzle;
   solidifying the molten polyamide by cooling;
   oiling the polyamide filament by introducing the polyamide filament through oiling rollers; and
   drawing the polyamide filament to obtain a drawn yarn having a squared-analogous cross-sectional contour defining a diagonal length dimension and a width dimension, wherein the squared-analogous yarn exhibits a squared anisotropic holding ratio (A/B) in a range of from 1.100 to 1.414, the A/B ratio representing a proportional relationship between the diagonal length and width dimensions.

* * * * *